United States Patent [19]

Muchnik et al.

[11] Patent Number: 4,877,666

[45] Date of Patent: Oct. 31, 1989

[54] MAGNETO-OPTIC SUBSTRATES

[75] Inventors: Boris J. Muchnik, Boulder, Colo.; Bernd F. Fischer, Wiesbaden, Fed. Rep. of Germany

[73] Assignee: Kerdix, Inc., Boulder, Colo.

[21] Appl. No.: 84,273

[22] Filed: Aug. 11, 1987

[51] Int. Cl.$^4$ ............................................... G02F 1/09
[52] U.S. Cl. ....................................... 428/64; 428/65; 428/908
[58] Field of Search ................. 428/64, 65, 412, 908, 428/542.8; 430/945

[56] References Cited

U.S. PATENT DOCUMENTS

| | | | |
|---|---|---|---|
| 3,816,237 | 6/1974 | Barrall et al. | 428/64 |
| 3,949,387 | 4/1976 | Chaudhari et al. | 340/174 |
| 4,390,600 | 6/1983 | Ohta et al. | 428/621 |
| 4,466,305 | 8/1984 | Connell et al. | 360/114 |

OTHER PUBLICATIONS

Brochure entitled *Meiki M—A Series Injection Moulding Machine*.
*Merlon CD 2000*, Brochure published by Mobay Chemical Corporation, Plastics Division, Pittsburgh, PA., Revision 3185.
Marchant, Alan B., "Retardation Effects in Mag-neto—Optic Readout", SPIE Proc. of Optical Mass Data Storage II, (San Diego, CA., Aug. 1986).
Chaudhari, P., et al., "Amorphous Metallic Films for Bubble Domain Applications," IBM J. Res. Develop., (Jan. 1973, pp. 66–68).
Kawabata, H., et al., "Characteristics of Magneto—Optical Disk With Media Sandwiched Between Protective Layers", *Optical Data Storage Technical Digest*, (Oct. 15–17, 1985, Washington, D.C.).
Toda, T., et al., "Analysis of Signal to Noise Ratio in Magneto—Optical Disk Using a Polarization Simulator", Topical Meeting on Optical Data Storage, *Technical Digest Series,* vol. 10, (State-Line, Nevada, Mar. 11–13, 1987), Optical Society of America, pp. 34–37.
Treves, David and Dan S. Bloomberg, "Effect of Birefringence on Optical Memory Systems", *SPIE Proc. of Optical Mass Data Storage II,* vol. 695, (San Diego, CA, Aug. 1986).

*Primary Examiner*—Nancy A. B. Swisher
*Attorney, Agent, or Firm*—Rothgerber, Appel, Powers & Johnson

[57] ABSTRACT

A method for molding a substrate for use in supporting a magneto-optic recording structure includes the steps of providing a mold having a cavity that defines a plane and that is designed to form a thin disk-like magneto-optic substrate and mounting such mold with such plane horizontal and an axis of circular symmetry thereof substantially vertical. Hot fluid plastic flows from the center of such horizontal mold so that the fluid plastic flows relatively uniformly and radially outwardly from the center of the mold to minimize azimuthal variations in birefringence. Such flowing may be by injection or compression molding. Molding apparatus for manufacturing such magneto-optic substrate includes such mold and a support for positioning such mold with the plane thereof horizontal. Hot fluid plastic is injected to the center of such mold, as for example from the vertical axis of symmetry of such mold. With the plane of the mold horizontal and the hot fluid plastic flowing radially and symmetrically outwardly from the center of the mold, the fluid plastic moves substantially radially and uniformly through the mold. The magneto-optic substrate has relatively small azimuthal variation in birefringence.

4 Claims, 2 Drawing Sheets

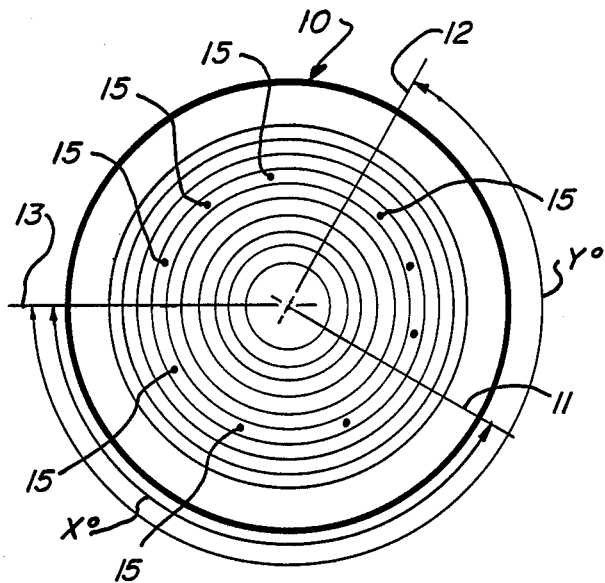
Fig_1 PRIOR ART
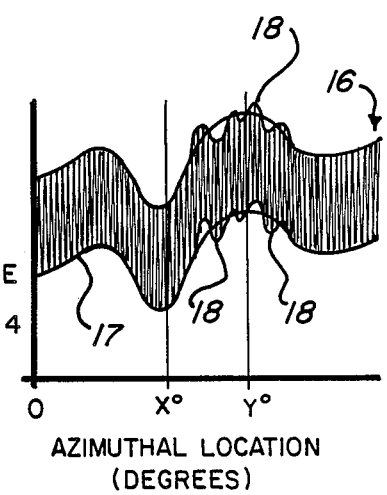
Fig_2 PRIOR ART
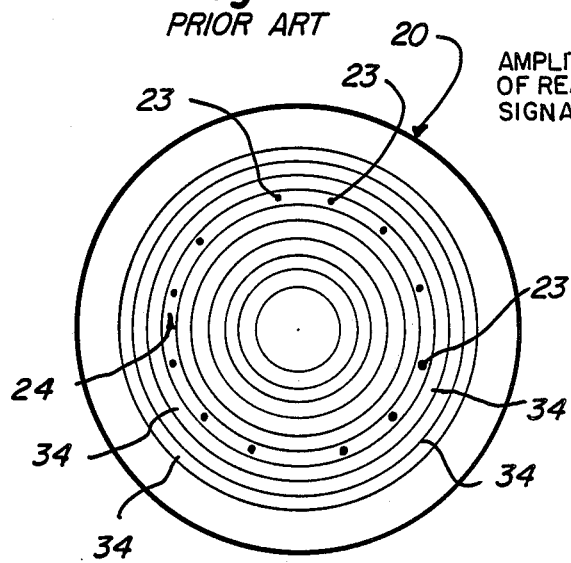
Fig_3A
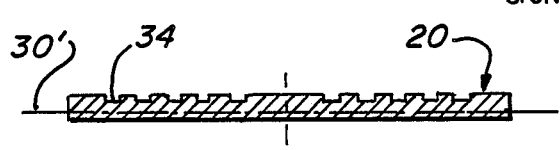
Fig_3B
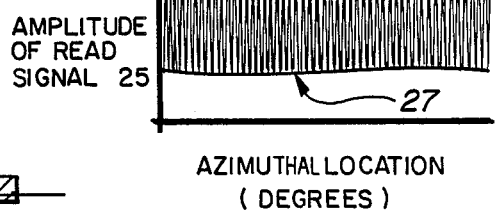
Fig_4

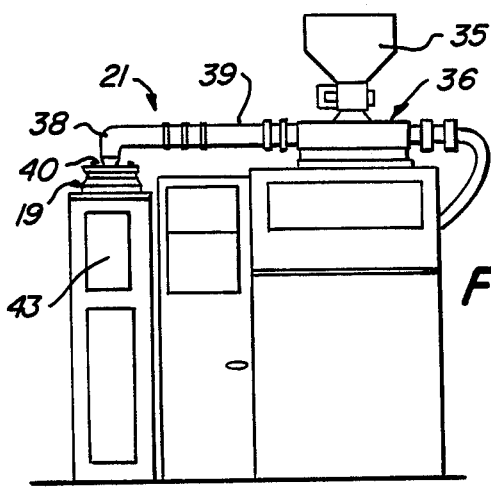
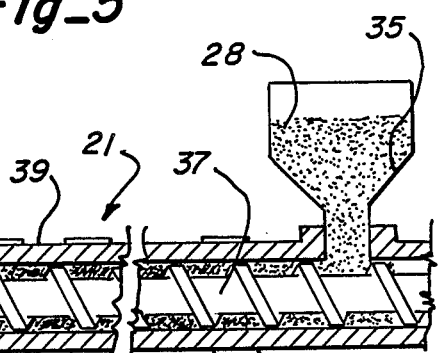
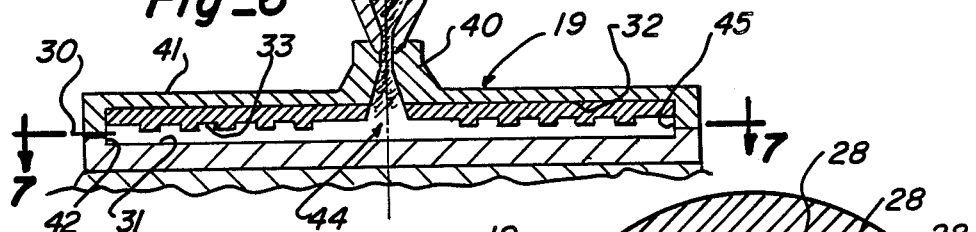
Fig_5
Fig_6
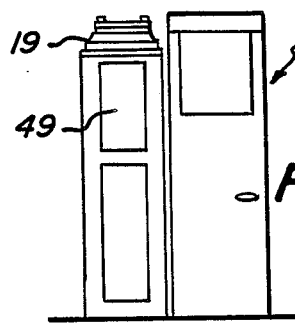
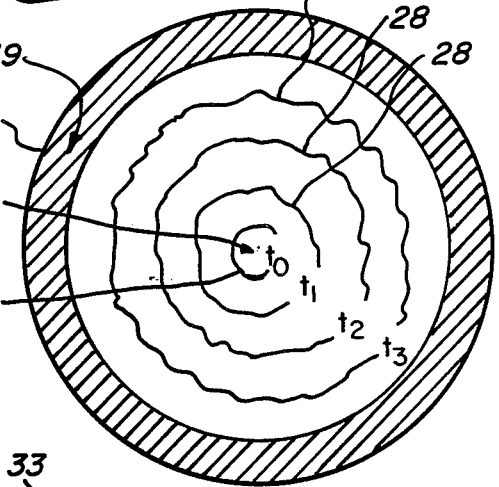
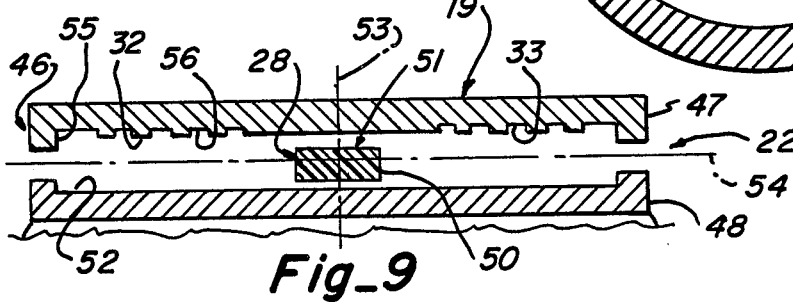
Fig_8
Fig_7
Fig_9

MAGNETO-OPTIC SUBSTRATES

BACKGROUND OF THE INVENTION

1. Field of the Invention

The present invention relates to the field of plastic substrates for magneto-optic records and more particularly to the field of magneto-optic records having substrates molded from plastic so as to have low variation in birefringence.

2. Description of the Prior Art

Magneto-optic (MO) recording technology is under intensive development by numerous companies in the United States, Europe, and Japan, because of the expectation of combining, in a removable MO record, the advantages of high track density associated with optical recording with the erasability associated with conventional magnetic disk recording.

As understood, the normal practice in the art of manufacturing a substrate for an MO record is to injection mold transparent plastic material that is selected as having high optical quality. Difficulties have been experienced in finding plastic materials having both high optical quality and the mechanical properties that are desired when the substrate both supports an MO thin film stack and transmits optical energy to such stack for recording and reading. For example, plastics such as polymethylmethacrylate (PMMA) can be molded so as to have excellent optical quality, but are undesirable with respect to such mechanical properties as dimensional stability in the presence of temperature, humidity extremes and centrifugal stresses. As an example, PMMA is quite permeable to moisture. If moisture permeates the substrate it can weaken the adhesion between the substrate and the active thin film structure, which tends to decrease the potential useful life of the record. Moisture permeation also causes the substrate to expand, further aggravating the adhesion and film cracking problem. Thus, those developing records based on this new MO recording technology have attempted to use plastics other than PMMA, such as polycarbonate (PC), which have better mechanical properties, such as dimensional stability and lower permeability to moisture. However, as compared to PMMA, PC substrates for MO records have less desirable optical properties in that the birefringence of PC substrates is greater than that of PMMA substrates. Birefringence in plastic MO media refers to the dependence of the index of refraction of the molded plastic substrate material upon the direction of the plane of polarization of light transmitted through the substrate. This birefringence is related to stresses in the plastic, usually created during the injection molding process and "frozen in".

Birefringence is undesirable in MO recording. In particular, as usually practiced in magneto-optic (MO) recording, a focussed beam of light or near-infrared radiation is focussed through the transparent plastic substrate of the MO record onto an active layer of the MO thin film structure. The active layer is magnetic material, the magnetization of which is all in one direction perpendicular to the plane of the substrate when the MO record is originally prepared prior to making a first recording. The beam of light or radiation, referred to as a recording beam, is effective, in the presence of a small magnetic bias field in the direction opposite to that of the magnetization, to heat minute recording locations of the active layer. This results in reversing the magnetization direction at such heated locations, since the magnetization there becomes aligned with the direction of the bias field. In such practice, the substrate provides not only support for the thin film structure, but dust defocussing of small particles of dirt to improve the accuracy of reading the minute recording locations.

The MO record is read by another light beam, the read beam, which may be the same as the recording beam but having reduced intensity and not being modulated. The read beam, which is plane polarized, is focussed on and is reflected by the active layer. Depending on the direction or orientation (up or down) of the magnetization at a given location, the plane of polarization of the read beam is rotated slightly clockwise or counterclockwise. This polarization rotation is referred to as the "polar Kerr magneto-optic effect". Birefringence in the substrate causes an unwanted, spurious additional rotation of the plane of polarization of the read beam, which adds to the signal polarization rotations produced by the magneto-optic Kerr effect, thus adding an undesired distortion, or "polarization noise" to the detected MO signal.

In attempts to process detected MO signals from MO records that include substrates having birefringence that varies from one recording location to another on the record, it has been found that the effect of such varying birefringence is to add to the signal both high frequency noise-like distortions and low frequency pedestal variations. Signal processing, such as by electronic high pass filtering, can separate the signal from low frequency components, but cannot separate the noisy components within the signal bandwidth.

SUMMARY OF THE INVENTION

Because injection molded PC MO record substrates have been observed as having such variation of birefringence problem, there have been continuing efforts to develop an MO substrate having desired optical, mechanical and other properties. Applicants' efforts to overcome the disadvantages of PC MO substrates have included a detailed analysis of the variations of the birefringence on a given PC MO substrate. Then, such variations from substrate to substrate have been analyzed. It was observed that there is a distinct similarity, from substrate to substrate within a batch of similar substrates, in the variation of prior art MO substrates as a function of circumferential (or angular) position (azimuth) around the substrate. This is particularly noticeable in the birefringence pedestal variation, and is recognizable as a "signature". Having identified such similarity of birefringence pedestal signature from substrate to substrate, efforts were made to determine the cause of such consistent variations.

In contrast to prior art MO substrates having undesirable variations in birefringence, and in contrast to prior methods of and apparatus for injection molding such substrates, the preferred embodiments of the present invention include methods of and apparatus for injection molding MO substrates having desirable mechanical properties and substantially improved optical properties, enabling the following objectives to be achieved.

Methods of, and apparatus for, molding MO substrates according to the present invention provide radial symmetry of the flow of hot, viscous fluid plastic through a mold during the molding process so that azimuthal variations in the birefringence of the substrate are substantially reduced.

The present invention also provides a plastic MO substrate having substantially reduced azimuthal birefringence variations.

A further object of the present invention is to provide a mold in a horizontal plane in a molding apparatus so that hot fluid plastic flowing through the cavity of such mold to form an MO substrate will flow symmetrically and radially, free from gravitational influences that would act on such hot fluid plastic if such mold were mounted vertically.

Another object of the present invention is to provide an improved method of molding a PC MO substrate in which the axis of circular symmetry of the mold is vertical instead of horizontal for forming a disk-like MO substrate.

With these objects in mind, a method in accordance with the present invention for molding a planar substrate for use in supporting a magneto-optic recording film structure includes the steps of providing a mold having a cavity that is designed to form the planar substrate as a thin disk. Such mold is mounted with such plane horizontal and the axis of circular symmetry thereof substantially vertical. Then, hot fluid plastic is flowed from the center of such horizontal mold so that the fluid plastic flows relatively uniformly and radially outwardly from the center of the mold to minimize variation in birefringence. Such flow of fluid plastic may be by compression or injection molding.

Injection molding apparatus in accordance with the present invention for manufacturing an MO substrate includes a mold having a cavity therein that defines a plane and that is for forming a disk-like MO substrate. The molding apparatus includes a support for positioning such mold with such plane of the mold horizontal. Hot fluid plastic is injected into the center of such mold, as for example from the vertical axis of circular symmetry of such mold. With the plane of the mold horizontal and the hot fluid plastic injected centrally, the fluid plastic moves substantially radially and uniformly from the center of the mold through the mold so as to minimize azimuthal variations in stress and birefringence in the resulting MO substrate. Such apparatus may be either a compression or an injection molding apparatus.

An MO substrate molded according to the present invention may be formed from plastic material and by the molding process of flowing hot fluid plastic horizontally and substantially radially and uniformly to provide the MO substrate with relative uniformity with respect to azimuthal birefringence characteristics.

BRIEF DESCRIPTION OF THE DRAWINGS

Other objects, features and advantages of the present invention will be apparent from an examination of the following detailed descriptions which include the attached drawings in which:

FIG. 1 is a top view of a prior art substrate for a magneto-optic record, showing two azimuthal or circumferentially spaced angular positions;

FIG. 2 is a graph of a signal generated in response to a read beam from a magneto-optic record having the substrate of FIG. 1, showing a birefringence signature that varies according to the azimuthal position around such record;

FIGS. 3A and 3B are respective top and edge views of a substrate according to the present invention for use in supporting a magneto-optic structure, wherein such substrate has relatively uniform azimuthal birefringence characteristics;

FIG. 4 is a graph of a signal generated in response to a read beam from a magneto-optic record having the substrate of FIGS. 3A and 3B, showing a birefringence signature that does not vary according to the azimuthal position around such record;

FIG. 5 is a vertical side view of an injection molding apparatus for producing the substrate shown in FIGS. 3A and 3B;

FIG. 6 is a detailed view of the injection molding apparatus of FIG. 5 showing a mold supported horizontally for receiving hot fluid plastic from a central sprue;

FIG. 7 is a cross sectional view taken along line 7—7 in FIG. 6 showing, in time sequence, the horizontal and radially uniform, symmetrical flow of hot fluid plastic from the sprue outwardly within the mold shown in FIG. 6 to produce the magneto-optic substrate shown in FIGS. 3A and 3B;

FIG. 8 is a vertical view of a compression molding apparatus having a mold extending horizontally; and FIG. 9 is an enlarged view of the mold of the compression molding apparatus of FIG. 8 showing a heated slug of plastic which is rendered hot and fluid for horizontal, radial and symmetrical flow in the mold for forming the substrate shown in FIGS. 3A and 3B.

DETAILED DESCRIPTION OF THE PREFERRED EMBODIMENTS

Prior Art Substrates

Referring to FIG. 1, a molded PC MO record substrate has been observed as having the above-referenced variation of birefringence problem. In particular, a detailed analysis has been made of the variations of the birefringence of a given one of such PC MO substrates 10, and of such variations from substrate to substrate. There is a distinct similarity from one substrate 10 to another in the variation of birefringence as a function of circumferential (or angular) position (azimuth) around the substrates 10. Circumferential, or angular, azimuthal positions are shown by radial lines 11 and 12 referenced to a 0 reference line 13. The line 11 is at an angle, or azimuthal position, of X° from the reference line 13, and the line 12 is at an angle of Y° therefrom. FIG. 2 shows a typical read signal 14 output from a detector (not shown) that has read a series of record locations 15—15 that are circumferentially (or azimuthally) spaced on the record 10. The vertical axis of the graph in FIG. 2 represents the amplitude of the read signal 14, which is a function of the rotations of the plane of polarization of a read beam (not shown) that is reflected from the MO record (not shown). Such rotations are caused both by the Kerr effect resulting from the up and down orientations of the magnetization of the record locations 15—15 and by undesired birefringence. A carrier wave 16 of the read signal 14 has a pedestal 17 having an amplitude that varies with angular position (shown on the abscissa) due to azimuthal variations in the birefringence of the substrate 10. Thus, the birefringence at the angle X° (line 11) is different from that at angle Y° (line 12), which is indicated by the different amplitudes of the pedestal 17 at X° and Y° in FIG. 2.

In the molding of the prior art substrate 10, the record location 15 at the line 12 is vertically spaced from the record location 15 at the line 11. The particular pattern of variation in the amplitude of the pedestal 17 with angular or azimuthal position around the substrate 10 is referred to as the birefringence signature, which is attributed to birefringence variations caused by the vertical orientation of the substrate 10 during molding thereof.

The more or less reproducible birefringence signature comprises relatively low frequency components of the birefringence variation illustrated by the low frequency variation of the amplitude of the pedestal 17. Also, it is likely that higher frequency components 18 of birefringence variation are associated with irregular, or possibly turbulent, flow in filling a mold (not shown) that is vertically oriented and is used to mold the prior art substrate 10. The higher frequency components 18 are not easily identifiable as part of the birefringence signature but contribute to an unwanted distortion or noise, called "polarization noise", in the reproduced recorded signal 14. Thus, in accordance with the present invention, improved flow characteristics associated with filling a horizontal mold 19 (FIGS. 6 and 9) of the present invention as compared with filling a prior art vertical mold (not shown) lead to reduced polarization noise. The high frequency polarization noise components 18 are more troublesome than the low frequency components of the birefringence signature, since they are less amenable to separation from the signal 14 by means of electronic filtering, because they fall within the same frequency band as the signal components.

Substrate 20

Referring to FIGS. 3A and 3B, a substrate 20 according to the method of the present invention may be molded by injection molding apparatus 21 (FIGS. 5, 6, and 7) or compression molding apparatus 22 (FIGS. 8 and 9). The substrate 20 has relatively uniform azimuthal birefringence characteristics. Thus, recording locations 23—23 around a circular, azimuthal path 24 exhibit no substantial birefringence variation due to the substrate 20 or the manufacture thereof. Rather, the rotation of the plane of polarization of a linearly polarized read beam of light (not shown) will be due to the Kerr effect resulting from the orientations of the magnetization of the record locations 23—23 and not from the birefringence of the material from which the substrate 20 is made. This is indicated in FIG. 4, which shows the same amplitude vs. azimuthal position characteristics as in FIG. 2, but for a read signal 25 derived from a record (not shown) using the substrate 20. However, the data shown in FIG. 4 indicates that a carrier wave 26 of the read signal 25 has a pedestal 27 having an amplitude that does not have any substantial variation with respect to azimuthal position. Moreover, the read signal 25 does not have any significant higher frequency components similar to the high frequency components 18 of the signal 14 (FIG. 2).

The substrate 20 of the present invention may be manufactured using the respective molding apparatus 21 or 22 shown respectively in FIGS. 5 through 7 or in FIGS. 8 and 9. In both apparatus 21 and 22, polycarbonate material 28 is positioned centrally in the mold 19 generally at the location at which a vertical axis 29 intersects a horizontal plane 30 defined by a cavity 31 of the mold 19. As shown in FIGS. 3A and 3B, the substrate 20 is thin and disk-like, such that the substrate 20 generally defines a plane (shown by line 30, in FIG. 3B). The polycarbonate material is rendered hot and fluid and in such state moves from such central axis 29 horizontally through the cavity 31 of the mold 19 symmetrically and radially, free from gravitational influences that would have acted on such hot fluid plastic polycarbonate material 28 if such mold were mounted vertically. Since the radial and symmetric horizontal flow results from the absence of gravitational forces acting on the material 28 that forms substrate 20 that tend to move the hot fluid plastic material 28 toward only one side of the mold 19, the above-described characteristics of the substrate 20 are achieved as shown in FIG. 4, as compared to the undesirable birefringence signature shown in FIG. 2 for the prior art substrate 10.

The cavity 31 may have a diameter of 130 mm., for example, and a thickness in the vertical direction of 1.2 mm. for producing the substrate 20 having similar dimensions. The plastic material 28 from which the substrate 20 may be molded is, in a preferred embodiment of the invention, Merlon CD-2000 polycarbonate resin designed for use in optical memory substrates. This is sold by Mobay Chemical Corporation. Further, in a preferred embodiment, one face 32 of the mold 19 is provided with a grooved metal stamper 33 so as to form grooves 34 in such preferred substrate 20. In a well-known manner, the grooves 34 are used for tracking.

Injection Molding Apparatus 21

The injection molding apparatus 21 shown in FIGS. 5 through 7 may, for example, be a SJ Series injection molding machine manufactured by Meiki of Japan, modified according to the principles of the present invention. The standard SJ Series injection molding machine includes a hopper 35 that supplies the plastic material 28, such as polycarbonate resin, to a heating and mixing system 36 that includes an auger 37 (FIG. 6) for advancing the hot fluid polycarbonate material 28 to the mold 19. The standard injection molding machine 21 is modified by providing a right-angle bend 38 in a heated barrel 39 for supplying the hot fluid plastic polycarbonate material 28 downwardly to a sprue 40 (FIG. 6) of the mold 19. The mold 19 is formed in two parts, a first part 41 being fixed, and a second part 42 being separable from the first part 41 under the action of an hydraulic mechanism 43. As shown in FIGS. 5 and 6, when the two parts 41 and 42 of the mold 19 are closed, the cavity 31 is formed and, as shown in FIG. 6, defines the disk-like plane 30 that is horizontal and generally perpendicular to the vertical axis 29. The hot fluid plastic polycarbonate material 28 is injected along such vertical axis 29 into the center 44 of the mold 19. As shown in FIG. 7, as time progresses from time $t_0$ through $t_3$, the injected hot fluid material 28 moves symmetrically and radially, free from gravitational influences that would act on such hot fluid plastic material 28 if such mold 19 were mounted vertically. The hot fluid polycarbonate material 28 flows outwardly to the outer edge 45 of the cavity 31 and is permitted to cool. Because the cooling occurs under conditions in which gravitational forces are negligible with respect to fluid flow in the horizontal plane 30 of the mold 19, the hot fluid material 28 does not cool with gravity forcing the material 28 against one portion of the edge 45 of the mold 19, as would happen if such mold 19 were mounted vertically. As a result, the characteristics shown in FIG. 4 are obtained for an MO record (not shown) made using the substrate 20 that is molded using the apparatus 21 shown in FIGS. 5 through 7.

It should be understood that the viscosity of the plastic material 28 decreases with increasing temperature so that, within limits, the viscosity during injection thereof into the mold 19 is under the control of the molding process engineer through control of sprue and mold temperatures. There are constraints, however, on the range of temperatures and viscosities that can be used. Lower temperatures, and therefore higher viscosity, leads to conditions where viscous forces completely dominate over gravitational forces, even for a vertical mold. However, in order to achieve fast injection and lower stresses (e.g. shear stresses), greater fluidity, and therefore higher temperatures must be used. Thus, the process temperatures and injection speeds must be experimentally optimized for a given type of plastic material 28 and a given molecular weight of material 28 to achieve the best overall molding characteristics. When an important parameter of these characteristics is birefringence, as it is for MO recording substrates 20, the horizontal mold 19 eliminates radially asymmetric flow due to gravity, which can otherwise lead to the azimuthal variations in birefringence discussed above. Consequently, with the horizontal mold 19, higher temperatures, or lower melt viscosities, can be used advantageously with respect to injection speed and stresses in the molded substrate 20.

Compression Molding Apparatus 22

The substrate 20 of the present invention can also be manufactured by the compression molding apparatus 22 shown in FIG. 8. Such apparatus 22 includes the mold 19 adapted for compression molding and referred to as a two-part mold 46. The mold 46 has a fixed half 47 and a movable half 48. The movable half 48 is under control of a standard hydraulically driven mechanism 49 that separates the mold halves 47 and 48 to permit a preform or slug 50 of hot pre-formed polycarbonate plastic material 28 (FIG. 9) to be inserted generally centrally within the mold 46 at a location 51 at which a cavity 52 of the mold 46 is intersected by a vertical axis 53 of circular symmetry. As the halves 47 and 48 of the mold 46 are moved together with the pre-form 50 in between and with plane (shown by line 54) of the mold 46 horizontal, and perpendicular to the vertical axis 53 of circular symmetry, the preform 50 of plastic material 28 is heated and becomes hot and fluid. The hot fluid polycarbonate material 28 is forced to flow horizontally and flows symmetrically and radially in a manner similar to that shown in FIG. 7, through the cavity 52 of such mold 46 from the central location 51 to the outer edge 55 of the cavity 52 to form the substrate 20 of the present invention. The half 48 of the mold 46 is moved downwardly after the substrate 20 cools, to permit removal of the substrate 20 from the cavity 52.

The process temperatures and speed of closing the mold halves 47 and 48 are controlled according to the type and molecular weight of material 28 to achieve molding characteristics consistent with use of the horizontal mold 46, similar to that described above with respect to the apparatus 21.

Method of Molding Substrate

The method of the present invention for molding the substrate 20 for use in supporting a magneto-optic recording film structure (not shown) includes the first step of providing a mold, such as the mold 19 or the mold 46 having a cavity, such as the respective cavities 31 or 52. Each of such cavities 31 and 52 is designed to form the substrate 20 in the form of a thin disk. Such mold 19 or 46 is mounted with plane 30 or 54 thereof extending horizontally and with the axes 29 or 53 of circular symmetry thereof substantially vertical. This is distinguished from the vertical orientation of the plane of the cavity of prior art molds (not shown) used for manufacturing the prior art substrates 10. With the mold horizontal and closed, in the case of the mold 19, or with the mold becoming closed in the case of the compression molding mold 46, hot fluid plastic polycarbonate material 28 flows from such axis 29 or 53 of circular symmetry through the cavity 31 or 52 in a horizontal direction, symmetrically and radially outward from such axis 29 or 53 of symmetry. The hot plastic material 28 flows relatively uniformly and radially outwardly as shown in FIG. 7 and results in forming the substrate 20 having minimal azimuthal variations in birefringence. The method of the present invention used with the apparatus 21 or 22 allows the magneto-optic substrate designer to have a wider choice of materials 28 from which to make the substrate 20. For example, materials having a lower melt viscosity at a given temperature, or lower molecular weights, might be used advantageously, since there is no concern that viscous forces must be high in order to dominate gravitational forces.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A substrate for supporting a magneto-optic recording layer and for transmitting optical energy to said layer for magneto-optic recording, said substrate comprising:
   a disk formed from polycarbonate material, said disk defining a primary plane having an axis of symmetry perpendicular thereto, said disk being characterized by having relatively uniform azimuthal birefringence characteristics and having recording locations around circular azimuthal paths which do not exhibit birefringence variations with respect to azimuthal position around said paths, said substrate being manufactured according to the following steps:
   providing a mold having a cavity designed to form said substrate as a thin disk that defines said plane and that has said axis of symmetry perpendicular thereto;
   mounting such mold horizontally with said axis of symmetry thereof substantially vertical; and
   flowing hot, fluid plastic material from said axis of said horizontal mold so that said fluid plastic flows from the center of said mold relatively uniformly and radially outwardly to minimize said azimuthal variations in birefringence of the resulting subtrate.

2. A substrate according to claim 1, in which:
said flowing is by injecting said fluid plastic material into said mold.

3. A substrate according to claim 1, in which:
said flowing is by compressing and heating a preform of said material.

4. A substrate according to claim 1, in which:
said steps result in said substrate having said relatively uniform azimuthal birefringence characteristics.

* * * * *